Dec. 22, 1953  D. C. HULL ET AL  2,663,681
RECOVERY OF LOWER ACID ANHYDRIDES BY DISTILLATION
Filed July 21, 1950
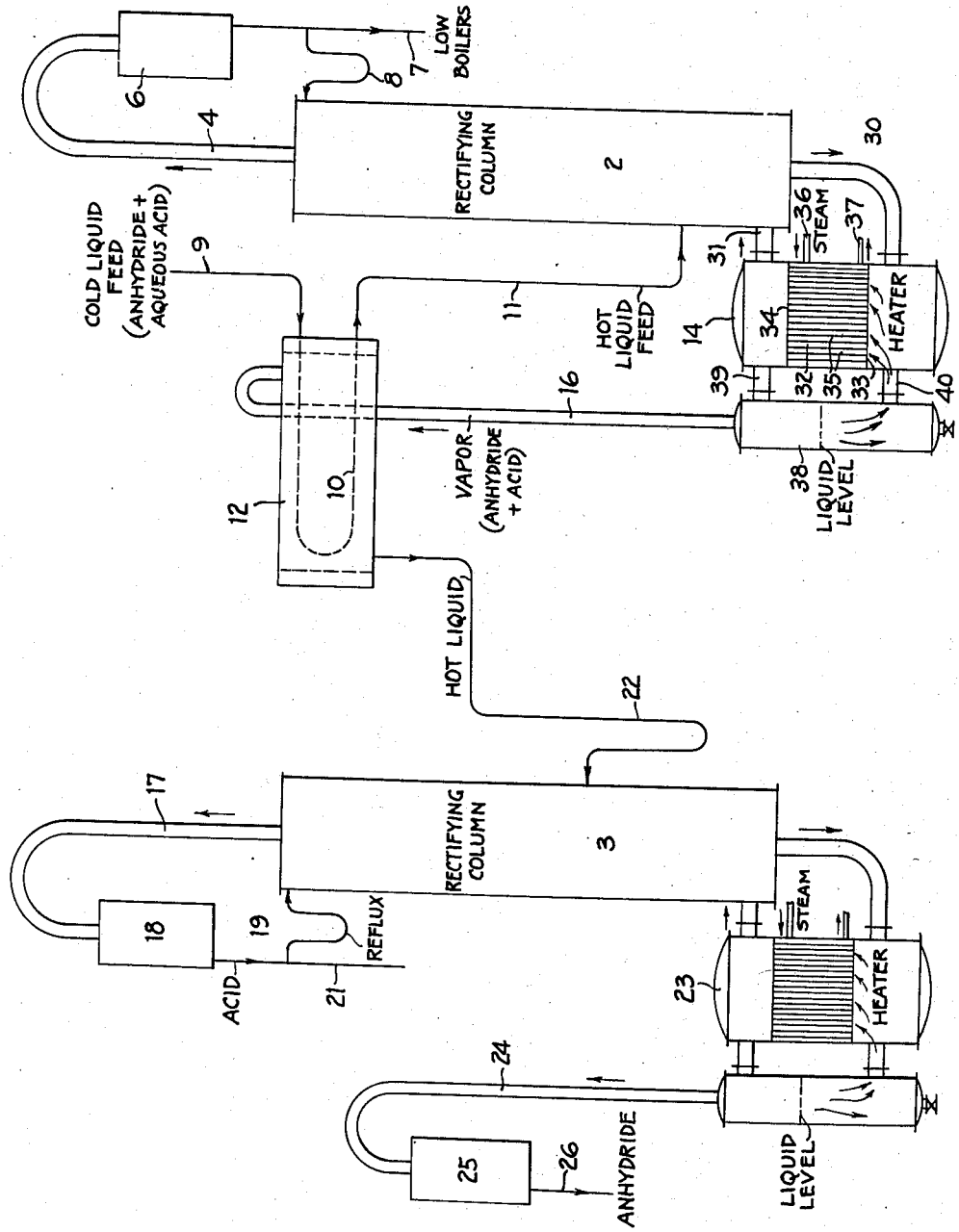
DAVID C. HULL
WILLIAM R. SAUNDERS
Inventors
By Daniel J. Mayne
Harold N. Powell
Attorneys Patented Dec. 22, 1953

2,663,681

UNITED STATES PATENT OFFICE 2,663,681

RECOVERY OF LOWER ACID ANHYDRIDES BY DISTILLATION

David C. Hull and William R. Saunders, Longview, Tex., assignors to Eastman Kodak Company, Rochester, N. Y., a corporation of New Jersey Application July 21, 1950, Serial No. 175,268

2 Claims. (Cl. 202—40)

This invention relates to the separation and concentration of anhydrides of organic acids. More particularly the invention is concerned with the process and apparatus for the concentration and separation of acetic anhydride from crude solutions thereof wherein the acetic anhydride is in the presence of acetic acid, water, and the like.

As is known, anhydrides of organic acids may be manufactured by several methods such as the pyrolysis of the corresponding acid, the oxidation of aldehydes, or the reaction of various chemical derivatives with other components to obtain a crude anhydride composition. This crude or raw anhydride as produced may contain varying amounts of acid, water, and other components. For example, in the manufacture of acetic anhydride by procedure involving the pyrolysis of acetic acid the resultant crude anhydride may contain substantial amounts of acetic acid and water.

Inasmuch as anhydrides are of reactive nature and exhibit a strong affinity for water, there is a problem in the efficient and economical separation of the anhydride in order to isolate a reasonably pure anhydride without too great a loss. A number of methods have already been proposed in the prior art for isolating anhydride from compositions containing the anhydride in the presence of water, acid, and the like. For example, it has been proposed by the methods shown in Patents 1,815,802 and 1,964,041 to add another chemical component, such as a chlorinated reagent or certain ethers, for assisting in removing by azeotropic distillation any water present with the anhydride. Thereafter, the anhydride and acid may be fractionated in some more or less conventional manner.

In other processes, such as described in Patent 2,166,997, a spray arrangement is proposed for injecting the anhydride mixture into heated acid for vaporizing away water which is present. Such prior types of processes, such as for example the introduction of an organic entraining agent, may leave small residual amounts of the entraining agent in the anhydride finally isolated, which small contamination might be objectionable should the anhydride be desired for certain exacting uses. The utilization of specialized mechanical equipment in the processing of anhydride presents problems because of the corrosive nature of the organic acids.

It has also been proposed to isolate anhydride by the simple fractionation thereof in a single fractionating column, operated either under normal, or part of the time, under reduced pressure. Such direct fractionation in a single column permits of isolation of the anhydride without contamination by an entraining agent. However, to obtain reasonably complete fractionation in accordance with such prior practice of utilizing a single column, reflux ratios of the order of 8 to 1 were employed. It is, therefore, apparent that considerable heat input is required in operating such a single column and limited capacity prevails because a substantial part of the output must be reutilized as reflux in the single column fractionation of the prior art.

It has now been found, in accordance with the present invention, how anhydride of as good a quality as obtainable by the single column fractionation, aforementioned, may be isolated in a more economical and efficient manner. That is, it has been found that by means of a certain combination of columns, such as for example with a combination of two columns of slightly increased length, that considerably more than twice the anhydride output of a single column may be obtained at less than twice the heat input now required for single column operation.

This invention has for one object to provide a process and apparatus arrangement for the separation of anhydrides of organic acids. Another and more specific object is to provide a process and apparatus arrangement particularly adapted to the separation and isolation of acetic anhydride from solutions, liquids, crude admixtures, or the like containing the anhydride in the presence of acetic acid, water, or other similar low boiling components. A still further object is to provide a process of the class described which is more efficient and economical in that it requires less heat input yet is capable of delivering larger amounts of anhydride. Still another object is to provide a novel combination of fractionating units particularly adaptable to the processing of anhydride containing liquids. Other objects will appear hereinafter.

For a more complete understanding of the present invention, reference is made to the attached drawing forming a part of the application.

This drawing comprises a semidiagrammatic side elevation view somewhat in the nature of a flow sheet illustrating an apparatus arrangement in accordance with the present invention.

Referring now to the drawing, there are shown two rectifying columns designated 2 and 3. These columns, as for example column 2, may comprise a standard bubble plate fractionating column of conventional type. That is, the standard single column discussed above already in use in an anhydride plant may be employed. Preferably the column will contain the equivalent of at least 20 plates. However, if it is a shorter column, in accordance with the present invention it is preferred to add a few additional plates to the top of the column, thereby increasing its height slightly so that there is available a column having the equivalent of 20 to 30 plates, for example. It is to be noted that the exact number of plates is not a limitation on the present invention, but for best operation there should be adequate plate capacity in the columns used.

With further reference to column 2 there is provided the usual vapor offtake conduit 4 which leads through a conventional condenser 6. Any usual condenser may be employed, either refrigerated or water cooled. Hence, detailed description is not required. In general, as it will be noted as the description proceeds, the individual parts making up the apparatus arrangement of the present invention may comprise standard commercially obtainable units.

Condenser 6 is provided with conduit 7 for withdrawal of condensate. Reflux line 8 is provided so that a sufficient portion of the condensate, as will be discussed in detail, may be returned to the column for refluxing.

Column 2 is also provided with a feed line designated 9—11. It will be noted that this feed line extents through (by means of coil 10) heat exchange device 12, as will be considered in greater detail hereinafter.

The lower portion of column 2 is suitably equipped with a base heater diagrammatically indicated at 14. This base heater is preferably of a special construction and connected by a plurality of conduits to column 2 so that there can be adequate and efficient circulation of the cooled liquid from the bottom of the column to the heater and return of hot liquid. The base heater 14 is also provided with a vapor offtake conduit 16 whereby vapors therefrom may be carried through the heat transfer device 12 already mentioned.

Referring further to base heater 14, this unit is connected to the bottom of column 2 by means of conduit 30. This conduit conducts the liquid from column 2 into the base heater whereby heat may be supplied thereto. Column 2 is also connected to base heater 14 by means of conduit 31 which is attached to the upper portion of the base heater whereby the heated vapors from the base heater reenter the column. Base heater 14 may comprise an enclosed tank of any desired configuration having positioned intermediate thereof a tube bundle 32 of usual construction. That is, the tube bundle is made up of tube sheets 33 and 34 which support the ends of a plurality of tubes illustrated by 35. The liquid to be heated passes up through these tubes. The outsides of the tubes are surrounded by steam or other heating medium supplied at 36 and withdrawn at 37.

Also attached to the base heater is a downcomer leg 38 attached at the top by conduit 39 and at the bottom by conduit 40. This unit 38 is merely an enclosed vertically extending tank and has the following functions: It provides an entrainment separator which allows the disengagement of liquid from vapor. It comprises a means for allowing convective forces to function, thereby helping to maximize the velocity of the liquid through tube bundle 32. This permits a high rate of heat transfer between the heat being supplied to tube bundle 32 and the anhydride being heated therein. This construction is also advantageous in that it prevents the anhydride sludge or the like components which may be present in the anhydride undergoing distillation from fouling the heating elements of the base heater.

Referring further to down-comer 38, there is provided from the top thereof the conduit 16 whereby vaporized anhydride and acid may be conducted to the heat exchanger as already described. It is mentioned at this point that the details of the construction of base heater 23, to be referred to hereinafter, are the same as base heater 14. Therefore, a detailed description under 23 will not be necessary.

Column 3 may be of the same general construction as column 2, that is, the columns may be of equal size and have approximately the same number of plates, but this is not essential as columns of unequal size may be employed. In the latter instance it is preferred that the larger column be used as column designated No. 2 in the present description. In further detail, column 3 is provided with a vapor offtake line 17, one or more condensers 18, reflux line 19, and drawoff line 21.

The feed line to column 3 which is line 22 interconnects the units by virtue of its attachments to unit 12 in a manner so that the liquid collected in 12 may flow therefrom to column 3. While it is possible to pump the liquids, for simplicity of construction, it is preferred that the arrangement and positioning of the parts be such that advantage may be taken of gravity flow, thereby avoiding the necessity of pumping a hot acid-containing liquid.

Column 3 is also provided with a base heater 23 which is connected by conduit 24 to a suitable anhydride condenser 25 from which anhydride may be withdrawn through conduit 26.

Referring now in further detail to the heat transfer unit 12, this unit may be a standard commercially available heat exchanger of a construction adapted to withstand organic acids and anhydrides. As may be observed from the drawing, unit 12 is somewhat similar in construction to a condenser in that the cold liquid entering through 9 picks up heat at 10 from the hot vapors supplied through 16. The liquid condensed within 12 flows out through conduit 22.

While a number of the parts may be constructed of copper or other commercial constructional materials, it is preferred to utilize stainless steel for many of the parts such, as for example, the well known Cr–Ni–Mo type of stainless steel. On certain of the parts, such as for example, the condensers, it may even be desirable to use parts made of or plated with noble metals such as silver or silver plated final condensers for preventing any possible contamination of the anhydride finally isolated.

The operation of the apparatus is apparent to a substantial extent from the drawing and the above description. However, further details respecting the process will be apparent from the following example concerning the separation of acetic anhydride in the presence of acetic acid and water. The particular mixture separated in accordance with this example comprised the condensed crude anhydride as obtained from a pyrolysis process for the manufacture of acetic anhydride. This crude anhydride was comprised of about 70% acetic anhydride, the balance being water and acetic acid. However, the process may be applied equally well to other compositions, as, for example, compositions containing between 40 to 80% anhydride, the balance being water and acid.

The anhydride containing composition as obtained from the pyrolysis process was in the form of a cold liquid. In other words, the vapors containing anhydride are usually immediately condensed by refrigeration or other rapid cooling to form a cold liquid and thereby minimize the reaction between the acetic anhydride and any water present therewith.

Referring to the drawing attached to the present application, column 2 has been started up by partially filling the column and base heater with acetic acid, supplying heat to the base heater to bring the column up to temperature, supplying cooling medium to the various condensers, and otherwise rendering the fractionation operative in the usual manner for carrying out distillations. The liquid mixture of acetic anhydride, acetic acid, and water was fed through conduit 9—10—11 into column 2.

Acetic acid and water vapor were volatilized from the top of the column through conduit 4 and were condensed in condenser 6. Sufficient of the condensate was returned through conduit 8 to provide a reflux ratio of approximately 3:1. It will be observed that this ratio is much lower than the ratio heretofore used and is entirely satisfactory because in column 2 no attempt is made to remove all extraneous components from the acetic anhydride. In other words, the fractionation carried out in column 2 is preferably sufficient to remove a substantial part of the water from the anhydride so that anhydride collecting in base heater 14 still contains acetic acid but only a small amount, if any, of water.

From base heater 14 the vapors of anhydride still containing acetic acid pass up through conduit 16 into heat transfer device 12. Inasmuch as these vapors are largely comprised of acetic anhydride, depending on the exact content thereof they would be at a temperature in excess of 120° C. or even 130° C. in some instances. Consequently, the cold raw feed entering through conduit 9 in the passage through conduit 10 rapidly becomes preheated, condensing the anhydride-containing vapors to a hot liquid. This hot liquid flows through conduit 22 into the second fractionating column 3. It will be observed that by the combination of columns as shown, heat economy may be effected since any heat not taken up by the incoming feed still remains in the hot liquid going to the second column and is utilized there.

Column 3 is operated generally similar to column 2 excepting that due to the higher concentration of anhydride in the liquid being fractionated therein, base heater 23 may normally be carried at a somewhat higher temperature in order that acetic acid having a boiling point of 118° C. is distilled out of the acetic anhydride. The acetic acid vapors together with any small amount of water fractionated in column 3 flows out through conduit 17 into condenser 18 wherein these vapors are condensed. Sufficient of this acetic acid condensate is returned through conduit 19 to the head of the column for refluxing, the remainder of the condensed acetic acid being drawn off through conduit 21 from which it may be returned to regular acid use or recycled to acid pyrolysis for preparing further anhydride. It will be observed that it is only necessary in the present invention, with the slightly longer columns already described, to reflux through conduit 19 sufficient liquid to provide a reflux ratio of about 3:1 as compared with the prior arts use of reflux ratios in the neighborhood of 8:1.

The vapors evolved from base heater 23 and flowing out through conduit 24 into condenser 25 are comprised of practically pure acetic anhydride which may be withdrawn at 26 and conducted to any of the desired uses for acetic anhydride.

By virtue of the particular construction shown for both base heaters 14 and 23 applicants are able to accomplish the circulation of the anhydride and acid as just described. That is, the upward velocity of the anhydride and acid to be heated up through the tubes exemplified by tubes 35 has backing it up the hydrostatic head of liquid in the down-comer exemplified by part 38. The down-comer permits the unvaporized portion of the base heater contents to return by way of the down-comer to the bottom of the base heater. However, at the same time there is provision for the disengagement of the vapors either through conduit 16 or 24 at the top of the down-comer from which the vapors of acid and anhydride or anhydride in the instance of conduit 24 may be removed for condensation. This circulating motion of the anhydride containing liquid in applicants' process through the heating tubes scrubs the surface of the tubes and thereby discourages any solid materials from coating on the surfaces of the tubes. In other words, by this manner of circulation in applicants' process the heat transfer is kept to a maximum because any fouling in the base heater at the principal point of heat transfer (the tubes) is discouraged. Fouling in the lower part of the base heater away from the vicinity of heat transfer does not cut down on the efficiency of heating. The residue deposited in the lower part of the base heater may be removed in the usual manner by cleaning.

In accordance with this example, the feed mixture entering conduit 9 in addition to containing acetic anhydride, acetic acid, and water as above described also contained some butyric anhydride within the range of 4% to 10%. The process was operated as above described, and the butyric anhydride followed the acetic anhydride through the process. There was withdrawn at conduit 26 an anhydride mixture comprising greater than 90% acetic anhydride but containing some butyric anhydride. This anhydride mixture was subjected to ordinary vacuum distillation for separating pure acetic anhydride from the butyric anhydride.

In another example, it was noted that the feed entering conduit 9 contained 4% to 10% propionic anhydride. The processing was the same as in the instance of butyric anhydride and the acetic anhydride-propionic anhydride final product obtained through 26 was separated by conventional vacuum distillation. It has been observed that if the contents of other anhydrides such as butyric anhydride and propionic anhydride constitute a very high percentage of the feed, it is preferred to dilute the feed with raw acetic anhydride so that the contents of the higher anhydrides do not exceed 25% or 30% and that the percentage of anhydride in the aggregate is preferably not more than 50% or 60%. The exact amount of such dilution is not critical but preferably would be sufficient for decreasing the boiling point of the feed liquid so that sufficiently high temperatures for distilling may be accomplished by steam heating.

The advantages of the method of the present invention wherein two fractionation columns are used in combination as above described, over its use of two independent columns will be further apparent from the following table:

PERFORMANCE OF REFINING STILLS

| Hookup | Pounds of Distillate | Steam Usage |
|---|---|---|
| No. 1 Still Alone | 33,000 | 4 |
| No. 2 Still Alone | 35,000 | 3 |
| Nos. 1 and 2 Stills Comibned in Accordance with the Present Invention | 166,000 | 3 |

Referring to the above table, the 166,000 pounds of distillate represents the amount of anhydride drawn off at 26 in accordance with the present invention over a certain unit period of time, say for example one complete shift.

In exactly the same unit period of time a total of only 68,000 pounds of distillate was obtained from two independently operated columns at the input of considerably more steam. It will be noted in connection with the double column combination of the present invention that there is somewhat more capital investment than with two independent columns in that there is the additional unit 12 and in that columns 2 and 3 each are a few plates longer, as already described, than when independent single columns are used.

However, all factors considered, it is believed that the double column combination exhibits substantial improvement in the magnitude of the savings in heat input as well as the greater capacity of anhydride product handled and withdrawn from the double column combination.

While it is not desired to be bound by any theory of operation, it is believed apparent that one reason for the lower heat input required in the present invention is derived from the use of less reflux, above described, as for example, of only about 3:1 as compared with 8:1. Inasmuch as in the first fractionation no attempt is being made to fractionate to 100% anhydride in one column the lower reflux ratio is adequate. With two columns in combination, in accordance with the present invention as described, it is possible to operate the first column where a lower boiling content is involved, at a more favorable temperature than where concentrated anhydride having a higher boiling point is involved. Therefore, with the double column combination of the present invention better heating control is possible than with a single column.

It is, therefore, apparent from the foregoing that a new method and apparatus arrangement have been described for the separation and isolation of a relatively pure high grade anhydride from compositions wherein the anhydride is in the presence of acid, water, and other lower boiling components, the anhydride constituting only a portion of the composition. While in the present description the use of columns of approximately the same size have been shown, the present invention is not limited in such details as it is possible to use columns of dissimilar size and make other reasonable changes in the present arrangement. In the event of using columns of dissimilar size, it would be preferred to place the larger column first in order and throw a greater load thereon. Other changes will be apparent to those skilled in the art.

We claim:
1. A method of separating an anhydride of a lower aliphatic acid from liquids containing the anhydride in the presence of lower aliphatic acid, water, and any other lower boiling constituents present which comprises feeding said liquid to a first distillation, heating the liquid in the first distillation in a heating zone connected for liquid passage through a downcomer flow zone outside of the heating zone, which downcomer zone assists in disengaging vapors from liquids passing therethrough, subjecting the liquid in the first distillation to sufficient distilling and fractionation for removing at least a greater part of the water and some of the acid as head products of said first distillation, condensing at least a part of these head products and returning condensate as reflux to the first distillation, accomplishing a preliminary separation of anhydride by removing vapors principally comprised of the anhydride but still containing acid and some water from the portion of said downcomer flow zone above the level of liquid therein, passing these vapors in heat transfer relationship with said feed to the first distillation to condense the vapors to a hot liquid and preheat said feed by transfer of latent heat given up in the condensation of the vapors, flowing this hot liquid to a second distillation, heating this hot liquid in the second distillation sufficiently to distill off as head products substantially all of the acid and any water remaining in said anhydride, withdrawing and condensing these head products, returning a portion of the condensed head products as reflux, and volatilizing off a substantially pure anhydride as the tail product of this second distillation.

2. A process for the separation of anhydrides from a mixture of acetic anhydride, at least one aliphatic anhydride higher than acetic anhydride, acetic acid and water which comprises diluting the aforesaid anhydride mixture with raw acetic anhydride so that the content of the higher anhydride in the diluted mixture does not exceed 25 to 30%, and that the total percentage of anhydride is not more than 50-60% of the mixture being separated, subjecting the mixture thus diluted to a first distillation wherein a substantial part of the water and some of the acid is removed to give a more concentrated anhydride, transferring this more concentrated anhydride to a second distillation wherein acid and water remaining are distilled off leaving a substantially anhydrous mixture consisting essentially of anhydrides and subjecting this mixture of anhydrides to vacuum distillation for separating the acetic anhydride from the higher anhydride.

DAVID C. HULL.
WILLIAM R. SAUNDERS.

References Cited in the file of this patent
UNITED STATES PATENTS

| Number | Name | Date |
|---|---|---|
| 896,434 | Chute | Aug. 18, 1908 |
| 1,507,108 | Cyphers | Sept. 2, 1924 |
| 1,940,699 | Ricard et al. | Dec. 26, 1933 |
| 2,310,649 | Peebles | Feb. 9, 1943 |
| 2,504,195 | Hall et al. | Apr. 18, 1950 |